United States Patent

Dublin, Jr. et al.

[11] Patent Number: 5,810,485
[45] Date of Patent: Sep. 22, 1998

[54] AUXILIARY BEARING SYSTEM

[75] Inventors: Wilbur Leslie Dublin, Jr., Georgetown; Dan McCay Arnold, Katy, both of Tex.

[73] Assignee: W. L. Dublin, Jr., Georgetown, Tex.

[21] Appl. No.: 999,220

[22] Filed: Dec. 29, 1997

Related U.S. Application Data

[62] Division of Ser. No. 611,364, Mar. 6, 1996, Pat. No. 5,642,944, and Ser. No. 786,758, Jan. 24, 1997.

[51] Int. Cl.$^6$ ........................................ F16C 19/52
[52] U.S. Cl. .............................. 384/626; 384/102
[58] Field of Search ...................... 384/626, 102, 384/101, 447, 126

[56] References Cited

U.S. PATENT DOCUMENTS

| | | | |
|---|---|---|---|
| 3,603,654 | 9/1971 | Bird | 384/102 |
| 4,666,317 | 5/1987 | Holthoff | 384/447 |
| 4,726,694 | 2/1988 | McFarlin | 384/114 |

OTHER PUBLICATIONS

Mechanistic Aspects of Burn–Off, Robert C. Leedham and William N. Weins, Presented at ASME/IEEE Joint Railroad Conference, Apr. 1, 1992, Atlanta, GA.

*Primary Examiner*—Lenard A. Footland

[57] ABSTRACT

This invention is directed toward a bearing system for a rotating element, and more particularly directed toward an bearing system which provides an auxiliary bearing system if the primary bearing fails. Transfer of load from the failing primary bearing to one or more auxiliary bearings is initiated by conditions generated by the failing primary bearing such as abnormal heat generation or abnormal torque impulses. Alternately, the invention can be used to prevent primary bearing failure by transferring load to the secondary bearing system if the primary bearing is overloaded. The transfer of load is completely automatic requiring no human intervention. A signal or warning is, however, emitted by the bearing system to notify that loading has been transferred to one or more auxiliary bearings. The invention is directed toward an auxiliary bearing system for tapered roller bearings used in rail cars. In railroad applications, the auxiliary bearing system allows time for the train to be safely stopped in the event of roller bearing failure, thereby significantly reducing the number of catastrophic bearing failures which often lead to hazardous and costly train derailments.

20 Claims, 3 Drawing Sheets

AUXILIARY BEARING SYSTEM

This is a Divisional of U.S. patent application Ser. No. 08/611,364 filed on Mar. 6, 1996, now U.S. Pat. No. 5,642,944, and U.S. patent application Ser. No. 08/786,758, filed Jan. 24, 1997.

This invention is directed toward a bearing system for a rotating element, and more particularly directed toward an auxiliary bearing system which, when employed with standard roller bearings of railroad cars, serves as an auxiliary bearing system if the primary roller bearing fails. Such an auxiliary system allows time for the train to be safely stopped in the event of roller bearing failure, thereby significantly reducing the number of catastrophic bearing failures which often lead to hazardous and costly train derailments.

BACKGROUND OF THE INVENTION

Bearing failure poses a potential problem in any mechanical device which utilizes bearings to reduce friction between moving elements of the device. More specifically, catastrophic failure of railroad car wheel bearings can lead to results such as train derailments which are extremely costly and extremely hazardous. Failing bearings are often difficult to detect, and go unnoticed by the train operator or "engineer". Insufficient detection or warning, therefore, eliminates the possibility of remedial action to prevent further bearing degradation and, as is often the case, eliminates the option of stopping the train before catastrophic bearing failure occurs. The present disclosure sets forth a primary and auxiliary bearing system which (a) provides auxiliary wheel bearings that, in the case of primary bearing failure, allows the wheel to operate for a time sufficient to safely stop the train, and (b) warns the engineer of a failing primary wheel bearings. It should be understood, however, that the disclosed bearing system can be effectively embodied in other devices.

SUMMARY OF BACKGROUND ART

Overheated railroad car wheel bearings, also called "hot boxes" in the industry, are an indication of bearing problems that may lead to catastrophic failure (generally called a "burn-off") if undetected. Such catastrophic failures often cause train derailments which cost the rail industry hundreds of millions of dollars per year and pose substantial threats to life and property. Even if an abnormally hot bearing is detected, catastrophic bearing failure occurs rapidly leaving little time between detection and remedial action. Robert C. Leedham and William N. Weins (*Mechanistic Aspects of Bearing Burn-Off*, ASME/IEEE Joint Railroad Conference, Apr. 1, 1992, Atlanta, Ga.), have published an excellent study of the mechanics of rail car bearing failure. This study indicates that abnormal heating and subsequent catastrophic failure, such as bearing seizure, can occur within 30 to 60 seconds. Such a failure often results in the involved wheel being actually separated from the axle of the rail car which, in turn, usually results in train derailment. Unfortunately, there is usually insufficient time for the engineer to bring the train to a safe stop, even if abnormal bearing heating is detected early.

The railroad industry has used various types and classes of detectors spaced at intervals along the tracks to monitor the cars of passing trains for overheated bearings. These "way-side" detectors include infrared sensors which scan passing wheel assemblies or "trucks" for abnormally high temperatures which, in most cases, indicate an overheating bearing. The engineer is then warned of any detected abnormalities, usually by means of a transmitted short range radio signal from the way-side scanning station. Acoustic detectors have also been used to detect failing bearings by being "tuned" to audio frequencies found to be indicative of failing bearings. Over the years, the spacings between these way-side detectors have been reduced from typically 30 to 35 miles to intervals of 15 to 30 miles. Considering typical velocities of trains and the rapidity at which bearing failure can occur, bearing heating can start and eventual wheel "burn-off" can occur between way-side monitors, even at the reduced spacings. Stated another way, properly operating way-side monitor can indicate normal bearing temperatures and the initial heating, bearing seizure, and wheel burn-off can occur before the next way-side monitor is reached. The engineer is, of course, unaware of the problem until catastrophic failure occurs.

Small radio transmitters, which are located in wheel assemblies, have been used to provide the engineer with instant warnings of heating bearings. These transmitters are connected to various types of temperature sensors and mounted within devices known as a "smart bolts" in the wheel assembly. If the temperature sensor senses an abnormally high temperature, an antenna is deployed from the smart bolt, and the radio transmitter is turned on through the switching on of a self contained battery power supply within the smart bolt. The radio transmitter then transmits a radio frequency (RF) signal by means of the protruding antenna to a receiver located within the engineer's compartment of the train engine. The received signal is converted to a warning signal thereby warning the engineer of an impending bearing problem. As discussed previously, bearing failure usually occurs rapidly and possibly within one minute or less. Even though the engineer may be warned of a bearing problem at the outset of the failure mode, there may be insufficient time to stop the train, which can require as long as ten minutes, before catastrophic bearing failure and wheel burn-off occurs.

Tapered roller bearings were introduced to the railroad industry with the expectations that catastrophic bearing failures and wheel burn-offs would be substantially reduced or even eliminated. The previously referenced study by Leedham and Weins found, however, that the number of burn-offs actually increased.

Based upon the brief discussion above, it is apparent that failed bearings in the rail industry are a major financial and safety problem. Abnormally hot bearings usually indicates an impending bearing problem. Present detection methods are not optimum. If, however, hot bearing are detected from the onset, the rapidity of bearing failure may not allow time for remedial actions to be taken or even allow time for the engineer to bring the train to a safe stop, or even to continue to an intermediate destination for repair. A system is needed, therefore, which not only immediately notifies the engineer of a heating bearing, but which also provides an auxiliary bearing to safely operate the involved wheel for a time period sufficient for the engineer to safely halt the train, or possibly deliver the malfunctioning car to a repair facility.

BRIEF SUMMARY OF THE INVENTION

One objective of the present invention is to provide an auxiliary bearing or bearings to which the load of the rail car is transferred if the primary wheel bearing of a rail car fails. A further objective of the invention is to provide an auxiliary bearing or bearings which will engage automatically in the event of failure of a primary rail car wheel bearing. A still further objective of the present invention is to provide an auxiliary bearing or bearings upon which the wheel of a rail car can operate safely for a time interval sufficiently to permit the train to be brought to a safe stop, or for an even longer time interval sufficient to transport the malfunctioning car to a siding or repair facility as noted above. A further objective of the invention is to provide means for notifying the engineer immediately if the temperature of a primary wheel bearing exceeds normal operating temperatures. A still further objective of the invention is to provide an auxiliary bearing system for any device which employs bearings. There are other embodiments of the invention that will be discussed in the following disclosure. Still further embodiments of the basic concepts of the invention will become apparent to those skilled in the art.

In present rail car truck wheel assemblies, standard roller bearings are attached to the side frame of the truck wheel assembly by means of a bearing adapter which is fitted into a rectangular side frame recess. The rotating axle of the wheel assembly passes through the roller bearing, and the bearing adapter is affixed to the side frame recess, with the wheel on the inboard side of the side frame. The present invention supplements the standard roller bearing used in truck wheel assembly with one or more auxiliary bearings. Either one or two or even more auxiliary bearings can be used, but for purposes of illustration and discussion in this disclosure, it will be assumed that two auxiliary bearings are used. A two auxiliary journal bearing embodiment will be used to illustrate the basic concepts of the invention. The auxiliary bearings may, however, take the form of any bearing capable of withstanding the load through simple kinematic revision. Journal bearings, which consist of partial sleeves, or "journals," are mounted on each side of the standard roller bearing. The outermost journal requires an extension of the axle that may be either integral or bolted onto the wheel/axle assembly. The auxiliary journal bearings have nominal clearance with mating bearing surfaces on the rotating axle of the car truck wheel assembly during normal operation. In this embodiment, a radial contraction or radially deformable shim sleeve is used to shim the bearing assemblies within the side frame saddle such that the full load of the rail car is transferred to the standard roller bearing under normal operating conditions. In the preferred embodiment, the radial contraction shim sleeve is made of fusible, normally rigid material. A bearing adapter serves to attach the tapered roller bearing to the side frame in a manner to react the load on the bearing outer race and to prevent said outer race from rotating.

Failing primary roller bearings usually generate abnormal amounts of heat, and the temperature of the bearing assembly rises as the roller bearing begins to fail. Furthermore, as the bearing fails, there is a dramatic increase in torque that the bearing adapter must react from the failing bearing. In the first embodiment discussed, a fuisable shim sleeve is employed. Material for the fusible shim sleeve element is selected such that, if the temperature of the bearing assembly rises above a certain predetermined value, the normally rigid shim sleeve will contract or deform radially by become plastic and preferably disintegrate by melting. This, in turn, lowers the auxiliary journal bearings thereby contacting the corresponding mating surfaces affixed to the wheel axle. This establishes an auxiliary load path thereby removing the load from the failing roller bearing. Clearance between the outer race of the standard roller bearing housing and the side frame saddle is established as the shim sleeve melts. The melting process continues, due to the positive temperature gradient from the actual failure site to the shim sleeve as the heat is conducted in that direction, to allow unrestricted rotation of the entire roller bearing housing. This allows the auxiliary journal bearing surfaces to come into contact and to assume and support the entire load of the failing tapered roller bearing while both races of the damaged roller bearing rotate harmlessly, in fully unloaded condition, on the axle with no relative rotation between its inner and outer races.

There are many factors which cause primary bearings to fail. All of these factors cause the temperature of the primary bearing to rise to an abnormal level as it fails, and there also is the previously mentioned torque increase, that is near impulsive in its nature, as the races and rollers spall, and the cages are distorted by violent mechanical deformations. The factors causing failure include abnormal exposure to moisture due possibly to operation in flooded conditions, abnormal exposure to load due possibly to overloading of the car, and the statistical anomalies of microscopic defects that unobservably diminish certain bearing's fatigue life. Conceptually, the auxiliary bearings can be engaged automatically based upon any of these factors. More specifically, in the last example, the shim sleeve can be made of material that becomes plastic or otherwise loses its load bearing capacity after a predetermined time interval chosen to be slightly shorter than the bearings service life as determined by its statistical service life. Such a material might include a sintered metal mixed with a small concentration of low level radioactive material which separately "fatigues" the sintered material over the predetermined period of time.

Alternately, the shim sleeve can be made of material which becomes plastic or otherwise looses rigidity after exposure to a predetermined, cumulative amount of moisture thus forcing inspection of the primary bearing after instances of service abuse. Such a material might include a sintered, or otherwise porous material, designed to absorb moisture and degrade thereafter in a predictable, expedited, manner relative to that of the primary bearing's material after severe, or prolonged, moisture exposure such as from flooding or otherwise undetected exposure to corrosive contaminants.

As a further alternate embodiment, the shim sleeve can be made of a material with a yield strength carefully controlled, by its material properties, or "mechanical fuse" geometric design, to provide a finite deflection sufficient to deploy the alternate bearing load path, and thus unload a primary bearing that has been overloaded. Such an overload condition would exhibit no external, or other physically observable, evidence of such damage prior to its accelerated failure in drastically diminished service life. In this instance, it probably would be preferable to use a ball, or secondary tapered roller, element to reduce the gap closure necessary to effect alternate bearing deployment. The mechanical fuse configuration may take the form of structures limited by material properties, or more preferably, geometric design for either ductile deformation or rupture, or brittle fracture to provide radial distortions of the shim sleeve sufficient to cleanly effect transfer from primary to alternate bearing load path. Time, moisture, or load sensitive shim sleeves will have accelerated modes of failure that are usually functions of multiple variables. As an example, failure of a load sensitive shim sleeve may also be a function of temperature. As an additional example, failure of a moisture sensitive sleeve may also be a function of load. It has been determined that temperature sensitive shim sleeves are much easier to specify and control to offer complete, and non redundant, alternate load path transfer. Furthermore, temperature sensitive shim sleeves offer failure detection before gross mechanical failure. Using the previously described shim sleeves of varying types, auxiliary bearings can therefore be automatically engaged after a predetermined service life time interval, moisture exposure, or overload condition. The preferred embodiment of the bearing system is, however, configured around a shim sleeve which melts due to virtually certain heat generated by a failing primary bearing, regardless of the factor or factors responsible for initiating the failure.

It is also highly desirable to actually prevent damage to the primary bearings resulting from either static overloading or impulse overloading. Static overloading damage can result, as an example, from simply overloading the rail car with freight. Impulse overloading damage can result, as an example, from load impulses delivered to the primary bearings from sources such as track irregularities. Overload damage is usually insufficient for physical detection, but is sufficient to generate fatigue origin. Primary bearing overload damage prevention is accomplished with the present invention by deforming the shim sleeve in direct radial displacement due to radial force which is (a) less than the critical load for failure initiation of the primary bearing, yet (b) greater than the primary bearing normal working load. As specific examples, the shim sleeve can be constructed so as to radially deform, thereby transferring load to the auxiliary bearing, if subjected to a load somewhat greater than the normal operating load of the primary bearing yet somewhat less than the critical load for primary roller bearing failure. Alternately, the shim sleeve can be constructed such that it fractures, thereby transferring load to the auxiliary bearing, if subjected to a load somewhat greater than the normal operating load of the primary bearing yet somewhat less than the critical load for primary bearing failure.

It should be noted that in all of the disclosed embodiments, the transfer of the load from the failing or overloaded roller bearing to the auxiliary bearings is "automatic" in that this transfer is not initiated by an independent measure or indication of roller bearing failure. No action by the train's engineer is needed to affect the transfer of load from the primary to the auxiliary bearings. It is, however, highly desirable to signal the engineer that such a load transfer has occurred so that the engineer can bring the train to a safe halt and take the required remedial actions. This signaling can be accomplished by means of temperature, acoustic, motion, or other types of sensors which respond to abnormal bearing operation, cooperating with the previously mentioned "smart bolt" telemetry technology or other means of transmitting the notice to the Engineer.

The auxiliary bearings are designed to have sufficient service life to allow for the train to be stopped prior to catastrophic failure of the axle from the normal progression of a failing primary roller bearing, and the derailment that almost always accompanies such catastrophic bearing failure. It is emphasized that a single journal or other type bearing, on either side of the roller bearing, can be adequate to provide the operational life to conservatively bring a fully loaded rail car to a stop. The use of dual auxiliary bearings, or dual auxiliary journal bearings in particular, can extend the operating range necessary to clear the rails for other traffic after detection of primary bearing failure. It is also again emphasized that, although the transfer of load from the primary roller bearing to the auxiliary bearing, or bearings, is automatic in that it is instigated by the melting of the fusible shim or other mechanical action, the engineer must still be notified of the failure so that remedial steps can be taken before the limited life of the alternate bearing is used up. The first remedial step is usually bringing the train to a safe stop to verify the location and nature of the problem.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

For purposes of clarity and continuity, the preferred embodiment of the invention is presented in four sections. The first section is directed toward a description of the physical elements of the invention. The second section is directed toward methods in which the elements of the invention cooperate with one another in order to achieve the stated applications goals. The third section presents alternate embodiments of the invention. Finally, materials used to fabricate certain elements of the invention are disclosed in the fourth section.

1. ELEMENTS OF THE APPARATUS

Figure 1:
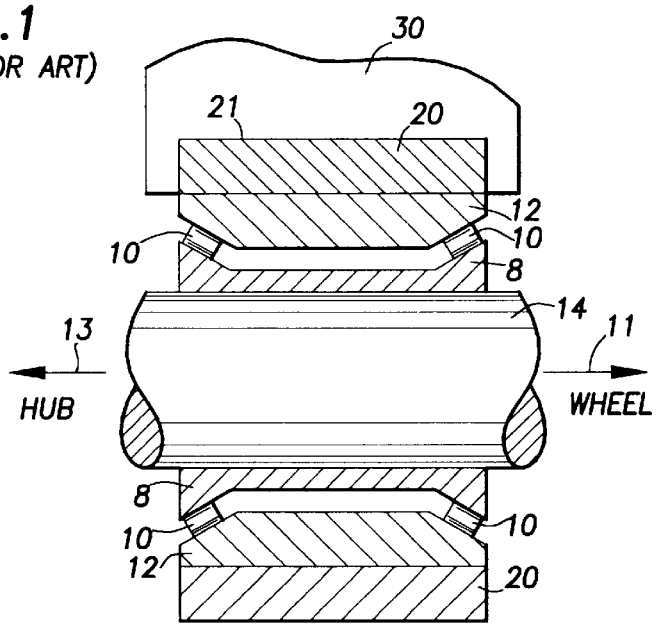
FIG. 1 is a conceptual, cross sectional illustration of a standard roller bearing of the type currently used by the railroad industry.

As a background for this disclosure, a cross sectional, conceptual, view of a standard roller bearing assembly is shown in FIG. 1. A cylindrical cone 8 is affixed to an axle 14. A cylindrical cup assembly 12 is mounted within a bearing adapter 20. The axes of the cone 8, the cup assembly 12, and the axle 14 are coincident. A roller assembly comprising roller elements 10 is positioned between the cone 8 and the cup 12 thereby forming the standard roller bearing assembly used in most railroad car truck wheels. A side view of the structure depicted in FIG. 1 would illustrate, as is well known in the art, that the cone 8, cup 12 and roller assembly consisting of rollers 10, are concentrically circular and centered on the axis of the axle 14. The bearing adapter 20 is preferably rectangular. This basic geometry is illustrated in a subsequent Figure. The bearing adapter is mounted within the side frame 30 of the truck wheel in a manner well known in the art. Additional components of the roller bearing assembly, which are well known in the art, have been omitted from FIG. 1 and subsequent Figures so that the basic concepts of the prior art and the present invention can be clearly shown and emphasized. The omitted components include structural elements such as the hub end cap and locking plate, roller bearing seal and lubricating assemblies, roller bearing seal wear rings, roller cages and the like. To further orient the reader, arrow 13 indicates that the axle end cap (not shown) is located to the left of the roller bearing assembly, and arrow 11 indicates that the wheel (not shown) is located to the right of the roller bearing assembly. The extension for the axle, necessary for employing an auxiliary bearing outside the primary bearing, is not shown; however, the end of the axle is tapered, and threaded for cap screws that ordinarily hold the end cap in position. These features lend themselves to the easy installation of an axle extension capable of supporting the full gross weight on that particular bearing during emergency auxiliary operation. The wheel (see FIG. 5) and cone 8 of the primary bearing are affixed to the axle 14 and therefore rotate as the rail car moves along the rails. The non rotating elements include the cup 12 which is affixed to the bearing adapter 20 mounted within side frame recess or "saddle" 21 machined into the truck wheel frame 30.

Figure 2A:
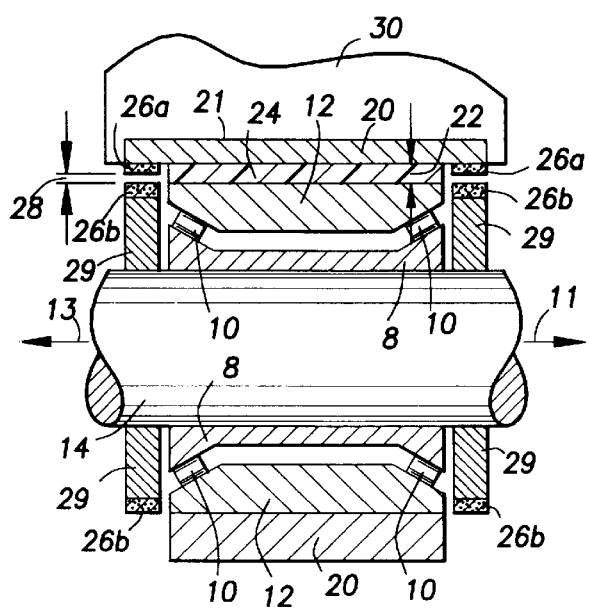
FIG. 2a is a conceptual, cross sectional illustration of the bearing assembly of the current invention, consisting of a standard roller bearing and two auxiliary journal bearings.
Figure 2B:
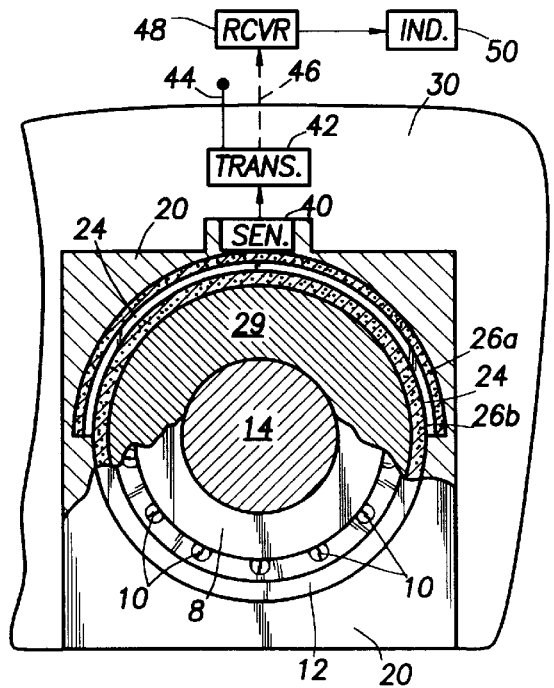
FIG. 2b is a conceptual, side view of the bearing assembly of the present invention and the auxiliary equipment used with the bearing assembly.

Attention is now directed to FIGS. 2a and 2b which are conceptual cross sectional and side view illustrations, respectively, of the primary and auxiliary bearing assembly of the present invention. As discussed previously, the present invention utilizes a standard tapered roller bearing as the primary bearing. The cone 8, cup 12, and rollers 10 of the roller bearing assembly are again shown positioned with respect to the axle 14. A fusible or otherwise radially contractable or radially deformable shim sleeve 24 is affixed to the bearing adapter in a manner to support a portion of the circumference of the cup 12. The thickness of the fusible shim sleeve 24 is denoted by the dimension 22 shown in FIG. 2a. The shim sleeve 24 is preferably centered at the top of the cup 12 and extends for preferably 180 degrees around the circumference of the cup 12 as shown in FIG. 2b. The bearing adapter 20 is mounted within a side frame recess saddle 21 in the side frame 30.

It is emphasized that there are other equally effective mechanical configurations of the invention in which the shim sleeve can be configured with the primary and the auxiliary bearings such that when the shim sleeve becomes plastic, fractures, or deforms mechanically, the load is transferred from the primary bearing to the auxiliary bearing. In an alternate embodiment (not shown), the cone 8 is affixed to a shim sleeve which, in turn, is affixed to the axle 14. If, as an example, the shim sleeve 24 melts due to overheating of the primary bearing assembly, the cone 8, cup 12, and rollers 10 are disengaged thereby transferring load to the auxiliary bearings.

As mentioned previously, the invention can be embodied with one auxiliary bearing positioned on either the "outboard" side (the end cap or axle extension side as indicated by the arrow 13) or the "inboard" side (the wheel side as indicated by the arrow 11) of the primary roller bearing. Alternately, two auxiliary bearings can be used with one bearing being positioned on outboard side and one bearing being positioned on the inboard side of the primary roller bearing. For purposes of discussion and illustration, the two auxiliary bearing embodiment will be considered. The two auxiliary bearing embodiment will, in general, extend the operational life of the auxiliary bearing system following failure of the primary bearing. Still referring to FIGS. 2a and 2b, rotating journal bearing supports 29 are shown affixed to the axle 14 on both sides of the roller bearing assembly. These plates are at right angles to the axis of the axle as shown in FIG. 2a, and are circular as shown in FIG. 2b although the lower half has been cut away to expose additional elements of the invention. Auxiliary journal bearing surfaces 26b are affixed to the circumference of each bearing mating plate 29. Opposite each of these journal bearing surfaces 26b, mating bearing surfaces 26a are affixed preferably to the bearing adapter 20. The clearance between the journal bearing surfaces 26a and 26b is denoted by the dimension 28. The magnitude of the dimension 28 is less than the magnitude of the thickness 22 of the fusible shim sleeve 24. Therefore, in the event that the shim sleeve 24 melts due to heating resulting from a malfunction of the primary bearing, the journal bearing surfaces 26a and 26b will come in contact as will be discussed in detail in a subsequent section.

Attention is now directed to FIG. 2b which illustrates conceptually a communication means for notifying the engineer of the train that any type of radial contraction shim sleeve employed has disintegrated. More specifically, if a fusible shim sleeve is employed, the communication means would notify the engineer that the shim sleeve has melted, that the load of the rail car has been transferred to the auxiliary journal bearing, and that remedial actions should be taken immediately. A sensing unit 40 senses events occurring in the bearing assembly and more specifically, that radial contraction or radial deformation of the shim sleeve has occurred. When a fusible shim sleeve is employed, the sensing unit 40 senses that the shim sleeve 24 has melted. Several sensor options are available. As an example, a motion detector can be used to sense that the dimension 22 (see FIG. 2a) has been reduced due to the melting of the shim sleeve 24. As a further example, a thermometer or thermocouple can be used to either detect an elevation of temperature in the overall bearing assembly or, preferably, monitor the temperature of the journal bearing surfaces 26a wherein an elevation in temperature above a predetermined threshold level indicates that the auxiliary journal bearings are loaded. This alternative also serves to detect abnormal friction that is indicative of impending failure of the alternate bearing itself. As a still further example, an acoustic sensor can be tuned to respond only to a frequency indicative of loading of the journal bearing surfaces. Once the sensor 40 detects that the auxiliary journal bearing is load bearing, the sensor 40 then activates the preferably RF transmitter 42 which deploys an antenna 44 and transmits a signal to a receiver 48. Preferably, the sensor 40 is mounted in the bearing adapter 20, which is illustrated in FIG. 2b with part of the side frame 30 being cut away for clarity. The RF transmitter and antenna deployment system exists in the prior art as systems known as a "smart bolts", (not shown) which are mounted in the locking plate and end cap assembly (not shown) of the rail car truck wheel. The broken line 46 conceptually indicates that the transmitter 42 is active and is in contact with the receiver 48. Upon receiving a signal from the transmitter 42, the receiver 48 activates an indicator 50 which notifies the engineer that the primary roller bearing has failed. The indicator 50 is within close proximity of the engineer and can display a light, emit an audible tone, or emit both a visual and audio warning. As stated previously, this warning signals the engineer to take immediate remedial actions.

Figure 3A:
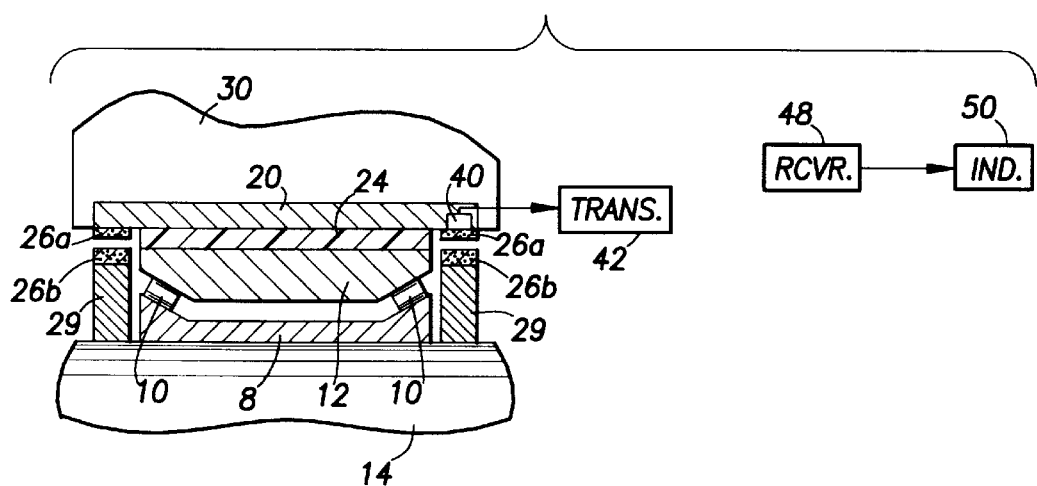
FIG. 3a is an illustration of the bearing assembly and auxiliary equipment of the current invention under normal operating conditions.
Figure 3B:
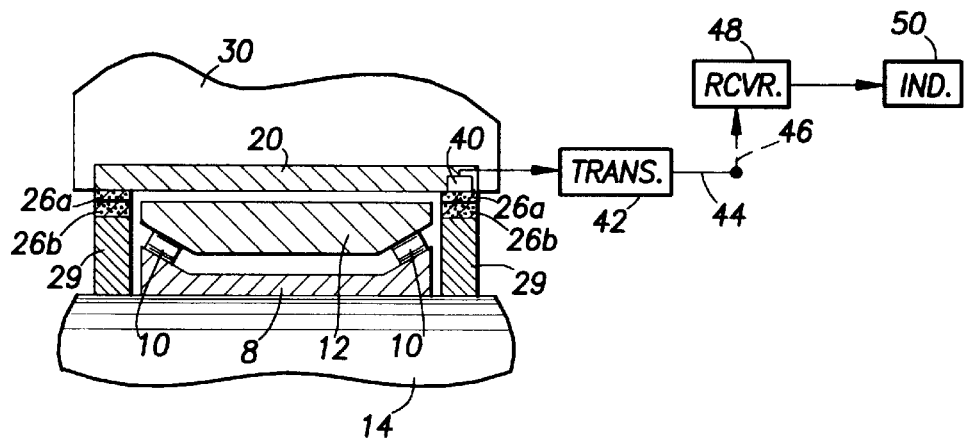
FIG. 3b is an illustration of the bearing assembly and auxiliary equipment of the current invention under conditions in which the primary bearing has failed and the load has been transferred to auxiliary journal bearings.
Figure 3C:
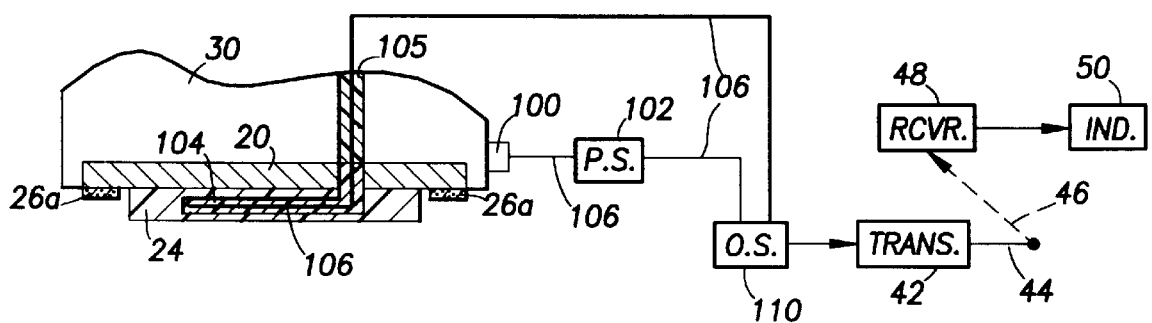
FIG. 3c is an illustration of an electrical sensor which senses the melting of the shim sleeve and sends a signal that the load has been transferred from the primary bearing to the auxiliary journal bearing.

An alternate electronic sensor is illustrated conceptually in FIG. 3c. The electrical lead 106 has a first end which is encapsulated with an electrical insulator 104 which is imbedded within an electrically conducting shim sleeve 24. The electric lead 106 passes from the insulator 104 through the bearing adaptor 20 and the side plate 30 and is electrically insulated from these elements by means of a feed through 105. The lead 106 is preferably serially connected with a circuit 110 which contains a "one shot" and subsequently connected serially with a power source 102 and finally terminating at the metallic side body 30 at a terminal 100. When the shim sleeve 24 is rigid, a first end of lead 106, which is imbeded within the insulator 104, is electrically insulated from a second end of lead 106, which is terminated at the terminal 100, thereby preventing current flow through the circuit 110. The material for the insulator 104 is selected so that it melts at essentially the same temperature as the shim sleeve 24. When the shim sleeve 24 and insulator 104 melt, current flows at least for a time sufficient to trigger the one shot in the circuit 110 thereby emitting a signal to the transmitter 42 indicating that the auxiliary bearing is load bearing. The transmitter 42 transmits a signal to the receiver 48 which activates the indicator 50 as previously discussed.

2. OPERATION OF THE APPARATUS

FIGS. 3a and 3b illustrate the major elements of the bearing system, unitizing a fusible shim sleeve and two auxiliary journal bearings, under normal conditions and under conditions of failing roller bearing wherein the fusible shim sleeve 24 has melted, respectively. It should be understood that operating principles are similar when other types of radially deformable shims and other types of auxiliary bearings are used.

Turning first to FIG. 3a, bearing assembly temperatures are below the melting temperature of the shim sleeve 24 indicating that bearing temperatures are normal and that the primary roller bearing is bearing the load of the rail car. For purposes of discussion, assume that the sensor 40 is a thermocouple which senses the temperature of the auxiliary bearing surface 26a. Since the auxiliary bearing surfaces 26a and 26b are not load bearing, the temperature indicating signal from the thermocouple sensor 40 is below the threshold needed to activate the transmitter 42. The transmitter 42 is dormant and the indicator 50 is likewise dormant.

Attention is now directed to FIG. 3b which illustrates the geometry of the bearing assembly at an abnormally high temperature which has caused the shim sleeve 24 to melt. Referring to FIG. 2b, it should be recalled that, under normal operating conditions, the thickness 22 of the shim sleeve 24 is greater than the gap 28 between auxiliary journal bearing surfaces. When the shim 24 melts, the bearing surfaces 26a and 26b come in contact and become load bearing, while the failing or failed roller bearing, including the cup 12, is free to rotate with the axle 14. Once the auxiliary bearing becomes loaded, the temperature of bearing surfaces 26a increases, the thermocouple sensor 40 detects this increase and, when a predetermined temperature level is exceeded, near the melting temperature of the sleeve 24, the transmitter 42 is activated. Antenna 44 is deployed and a signal, illustrated conceptually by the broken line 46, is sent to the receiver 48. The receiver 48 then activates the preferably audio and visual indicator 50 thereby warning the engineer that a primary roller bearing failure has occurred and that a truck wheel is operating on an auxiliary journal bearing.

3. ALTERNATE EMBODIMENTS

Figure 4:
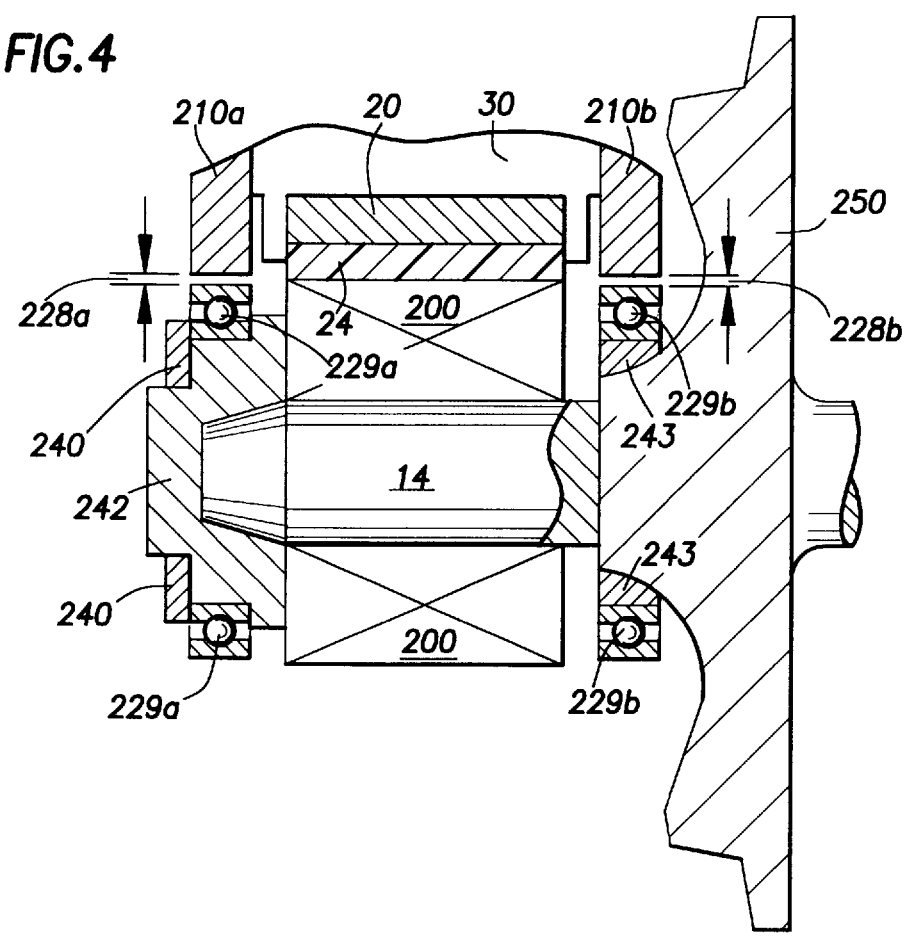
FIG. 4 is a conceptual, cross sectional illustration of an auxiliary bearing system using ball bearings as auxiliary bearings.

As stated earlier, other types of auxiliary bearings can be used to embody the invention. FIG. 4 is a cross sectional illustration of the invention embodied with two auxiliary ball bearings denoted by the numerals 229a and 229b. The inner race of auxiliary ball bearing 229a is affixed to an axle extension-end cap 242 by means of a bearing retainer 240. The inner race of auxiliary ball bearing 229b is affixed to an inboard bearing adapter 243 which is attached to the axle 14. Both auxiliary bearings 229a and 229b are normally unloaded. Still referring to FIG. 4, the primary roller bearing, identified in general in this illustration by the numeral 200, is affixed to the wheel axle 14 as discussed previously. The rail car wheel 250 is shown as an integral part of the axle 14. Again, the radially contractible shim sleeve 24 is positioned between the shim sleeve 24 and the bearing adapter 20 such that when the shim sleeve 24 is rigid, the primary roller bearing 200 is load bearing. Furthermore, when the shim sleeve 24 is rigid, spaces 228a and 228b exists between the outer races of the auxiliary ball bearings 229a and 229b and the corresponding sides plates 210a and 210b, respectively. These side plates are rigidly attached to the truck side frame 30. For purposes of discussion, assume that a fusible sleeve 24 is employed. If the primary bearing 200 begins to fail, heat is generated thereby melting the shim 24. This, in turn, closes the spacings 228a and 228b thereby transferring load from the primary bearing 200 to the secondary roller bearings 229a and 229b. This embodiment is ideally suited for installation with minimal modification of standard wheel trucks. The axle 14 must be retrofit machined to receive the inboard bearing adapter 243, while the axle extension-end cap 242 provides support for the auxiliary ball bearing 229a.

Figure 5:
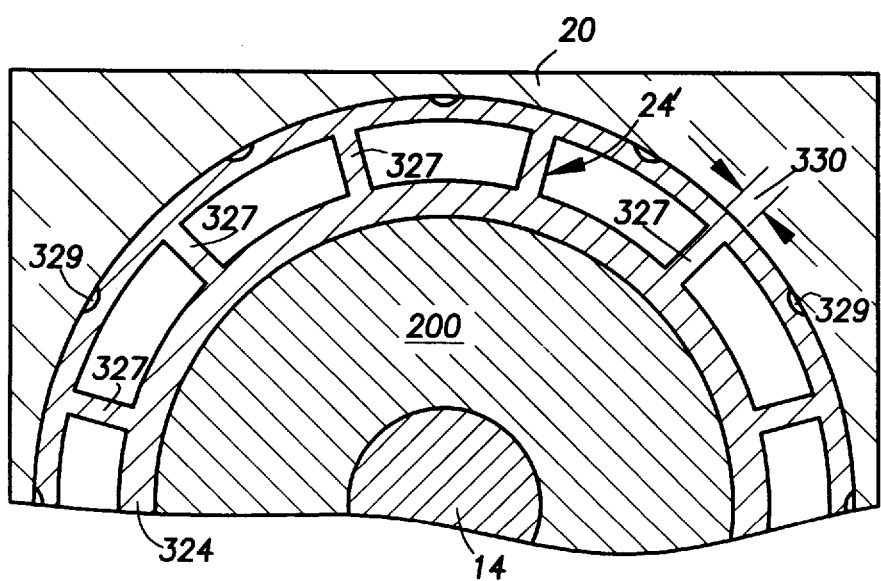
FIG. 5 illustrates a conceptual side view of a shim sleeve which radially contracts under abnormal torque induced by a failing primary bearing.

FIG. 5 illustrates a radially contractible shim sleeve, denoted in general by the numeral 24', which contracts radially or "collapses" due to torque impulses generated by a failing primary bearing 200. As in previously discussed in the fusible shim sleeve embodiments, the shim sleeve 24' is mounted between the side frame 20 and the outer race of the main roller bearing denoted by the numeral 200. The shim sleeve comprises an inner rim 324 and an outer rim 325 which is separated by a plurality of preferably evenly spaced radial spacers 327. The radial spacers or even the entire shim sleeve can be made of brittle material. In the event of a failing main bearing 200, an abnormally high torque is applied to the shim sleeve thereby fracturing the spacers 327 and thereby radially collapsing the shim sleeve 24' and transferring load from the primary bearing to one or more auxiliary bearings (not shown) in a manner discussed previously. Grease can be stored in the indentions 329 on the outer rim 325 to lubricate the bearing assembly and dramatically reduce the load at the outer rim until fragments of the brittle shim sleeve fall to the rail track.

Still referring to FIG. 5, the radial spacers 327 or the entire shim sleeve 24' can be made of ductile material such that when exposed to an abnormal torque, the radial spacers would bend thereby decreasing the outer radius of the shim sleeve and thereby transferring the load from the primary bearing 200 to one or more auxiliary bearings (not shown) in a manner discussed previously in detail.

The thickness 330 of the radial spacers 327 can be varied according to the material used for the spacers, the load that the spacers are required to bear under normal operating conditions, and the magnitude of torque at which the shim sleeve is desired to collapse radially.

4. MATERIALS

The selection of materials used to fabricate certain elements of the bearing assembly is critical in obtaining the previously discussed performance features of the bearing assembly.

Attention is first directed toward the normally rigid material used to fabricate the fusible shim sleeve element identified by the numeral 24 in FIGS. 2a, 2b, 3a and 3b. The first requirement is that the material become non rigid and preferably melt at a temperature above that of a normally operating bearing assembly, but below the temperature generated by a malfunctioning roller bearing well before its catastrophic failure. The second requirement is that the structural strength of the material is sufficient to perform the mechanical shimming function under the routine service loads applied. Addressing first the temperature requirements, the previously referenced work of Leedham and Weins shows that bearing assembly temperature rises approximately 250° to 350° F. prior to catastrophic failure, and that normal operating temperature is quite close to ambient temperature. The shim sleeve should preferably melt at temperatures below "catastrophic" temperatures which cause wheel burn-off. These melting temperature requirements and the previously mentioned structural requirements are met by alloys of lead and tin, with alloying that is well known in the art to adjust bearing strength and melting point. Alternatively, a composite material consisting of a fusible matrix with a reinforcing granular or fiber material capable of carrying the limit load of the primary bearing indefinitely can be used. Furthermore, these materials are easily formed and are relatively inexpensive. Alternatively, plastic or reinforced plastics with a critical temperature in this range may be used as consistent with the service requirements.

Attention is next directed toward the auxiliary journal bearing surfaces designated by the numerals 26a and 26b in FIGS. 2a, 2b, 3a and 3b. These materials must exhibit the obvious lubricating properties of a journal bearing surface, and furthermore must maintain these lubricating properties, under loaded conditions, for at least ten to fifteen minutes which is a typical time interval required to stop a train which has been moving at perhaps 50 to 70 miles per hour. Sintered metals impregnated with lubricants such as "Bostbronz" manufactured by The Boston Gear Company of Boston, Mass, U.S.A. meet these requirements. Alternately, the bearing surfaces can be fabricated from bonded tetrafluoroethylene (TFE) fluorocarbon polymers (trade name Teflon) materials such as those manufactured by Fafnir, Borg-Warner and others. In a further embodiment of the invention, the melting shim sleeve material is directed toward providing, or augmenting, lubrication for the journal bearing surfaces. Lubricant can be stored in a reservoir within the gap between journal surfaces to be released by the melting of the shim sleeve, and/or the mechanical action of closing of the gap. Such stored material can also provide environmental protection for the unloaded journal surfaces.

While the foregoing is directed to the preferred embodiments of the invention, the scope thereof is determined by the claims which follow.

What is claimed is:

1. An auxiliary bearing system for receiving loading of a primary bearing, the auxiliary bearing system comprising:
   (a) a shim sleeve cooperating with said primary bearing such that said shim sleeve renders said primary bearing load bearing when said shim sleeve is rigid; and
   (b) at least one auxiliary bearing, wherein said at least one auxiliary bearing becomes load bearing when said shim sleeve radially deforms when exposed to a force above a predetermined magnitude.

2. The auxiliary bearing system of claim 1, wherein said wheel bearing system cooperates with a wheel of a rail car.

3. The auxiliary bearing system of claim 2 further comprising a warning system to notify the operator of an engine towing said rail car that said at least one auxiliary bearing is load bearing.

4. The auxiliary bearing system of claim 1 wherein said shim sleeve radially deforms when exposed to a torque above a predetermined value.

5. The auxiliary bearing system of claim 1 wherein said shim sleeve radially deforms when exposed to a radial force greater than the working load of the primary bearing and less than the primary bearing failure initiation load.

6. A shim sleeve cooperating with a primary bearing and an auxiliary bearing, wherein:
   (a) said primary bearing is load bearing when said shim sleeve is rigid; and
   (b) said secondary bearing becomes load bearing when said shim sleeve is irreversibly radially deformed by a force above a predetermined level.

7. The shim sleeve of claim 6 wherein said force comprises a torque above a predetermined value.

8. The shim sleeve off claim 6 wherein said force comprises a radial force greater than the working load of said primary bearing and less than a primary bearing failure initiation force.

9. An auxiliary bearing system for a rail car which cooperates with a primary roller bearing comprising a cone element concentrically affixed to an axle of said rail car and a concentric cup element affixed to a side plate of a truck of said rail car and a plurality of roller elements dispersed there between, said auxiliary bearing system comprising:
   (a) a normally rigid shim sleeve affixed to said cup element such that said cup, roller, and cone elements bear a load imposed by said rail car; and
   (b) at least one auxiliary bearing, wherein said at least one auxiliary bearing bears said load imposed by said rail car in the event that said shim sleeve radially deforms as a result of exposure to force.

10. The auxiliary bearing system of claim 9 wherein said shim sleeve is formed of material which radially deforms by plastically deforming as a result of torque generated by a malfunctioning primary roller bearing.

11. The auxiliary bearing system of claim 9 wherein said shim sleeve is formed of material which radially deforms by fracturing as a result of torque generated by a malfunctioning primary roller bearing.

12. The auxiliary bearing system of claim 9 further comprising:
   (a) a sensor which responds by emitting a signal indicative of the transfer of said load from said primary roller bearing to at least one said auxiliary journal bearing;
   (b) an indicator which responds to said signal; and
   (c) a transfer device which transfers said signal to said indicator.

13. The auxiliary bearing system of claim 12 wherein said sensor comprises:
   (a) a power supply;
   (b) a one shot; and
   (c) a lead comprising electrical insulation wherein
      (i) said insulation melts at essentially the same temperature at which said shim sleeve melts, and
      (ii) said lead cooperates with said power supply, said one shot, and said shim sleeve such that said one shot is triggered when said insulation melts thereby emitting a signal for transfer by said transfer device.

14. The auxiliary bearing system of claim 12 wherein said transfer device is a radio transmitter.

15. The auxiliary bearing system of claim 12 wherein said sensor comprises a thermocouple which senses the temperature of said auxiliary bearing system.

16. The auxiliary bearing system of claim 8 wherein:
(a) said at least one auxiliary bearing comprises a journal bearing; and
(b) wherein said at least one journal bearing comprises a journal bearing surface and a bearing mating plate and affixed to said truck such that, in the event that said shim sleeve radially deforms, said journal bearing surface contacts said bearing mating plate so as to transfer said load from said primary roller bearing to said at least one auxiliary journal bearing.

17. The auxiliary bearing system of claim 16 wherein said at least one auxiliary journal bearing comprises sintered material.

18. The auxiliary bearing system of claim 17 wherein said sintered material comprises tetrafluoroethylene fluorocarbon polymers.

19. The auxiliary bearing system of claim 17 wherein said sintered material comprises sintered metals impregnated with lubricants.

20. The auxiliary bearing system of claim 16 comprising two auxiliary journal bearings wherein one is located on each side of said primary roller bearing in a position concentric with said axle.

\* \* \* \* \*